United States Patent [19]
Lamb, Jr. et al.

[11] Patent Number: 5,689,337
[45] Date of Patent: Nov. 18, 1997

[54] COAXIAL DISC-MOUNT FOR MEASURING FLATNESS OF COMPUTER-DRIVE DISCS BY INTERFEROMETRY

[75] Inventors: Joseph A. Lamb, Jr.; Chiayu Ai, both of Tucson, Ariz.

[73] Assignee: Wyko Corporation, Tucson, Ariz.

[21] Appl. No.: 698,547

[22] Filed: Aug. 15, 1996

[51] Int. Cl.$^6$ ................................................ G01B 9/02
[52] U.S. Cl. .................................... 356/359; 356/345
[58] Field of Search ............................ 356/345, 359, 356/360

[56] References Cited

U.S. PATENT DOCUMENTS 5,416,586  5/1995  Trowlowe et al. .................. 356/359
5,457,534  10/1995  Lacey et al. ........................ 356/359

Primary Examiner—Frank G. Font
Assistant Examiner—Robert Kim
Attorney, Agent, or Firm—Antonio R. Durando

[57] ABSTRACT

An interferometer mounting mechanism that consists of a horizontal shaft rigidly connected to the interferometer in axial alignment with the optical path of the instrument and protruding through an opening in the center of the transmission flat. A sample stage adapted to receive a computer-drive disk is attached to the distal end of the shaft, so that the stage is directly and rigidly connected to the interferometer. The sample stage consists of a hub capable of retaining a disk in precise alignment with the transmission flat by hanging its center hole on two support posts and resting the disk on three pressure tips on the hub. A system of push-pull adjustment screws is provided to set the proper tip/tilt of the disk.

31 Claims, 5 Drawing Sheets

COAXIAL DISC-MOUNT FOR MEASURING FLATNESS OF COMPUTER-DRIVE DISCS BY INTERFEROMETRY

BACKGROUND OF THE INVENTION

1. Field of the Invention

This invention pertains to the general field of interferometry and apparatus for testing surfaces. In particular, it provides a novel approach for testing computer-drive glass disks.

2. Description of the Prior Art

As computer equipment becomes smaller and subject to wear and tear associated with portability, the precise flatness of drive disks becomes more and more critical to high-speed performance and reliability. Thus, conventional aluminum disks are increasingly being replaced by glass disks, which are lighter and less subject to warpage and, therefore, preferable for most applications. The flatness of both kinds of disks is typically tested for quality control by interferometric measurements that identify damaged or substandard areas on either of the two parallel surfaces of a disk. The flatness of one surface of the disk is first measured on an instrument such as a Fizeau interferometer and the disk is then flipped over to test the opposite surface.

Thus, the surface geometry of an aluminum or glass computer disk can be measured with a Fizeau-type interferometer with reference to a flat reference surface (known in the art as a transmission flat). As illustrated in schematic representation in FIG. 1, the interferometric device 30 comprises a light source 10 (normally a laser operating in the single mode) producing a beam of light 12 that is passed through a microscope objective 14 and a spatial filter 16, such as a pinhole. The light 12 is then collimated by a very-well corrected collimating objective 18 and directed through a transmission flat 20 (comprising the reference surface 21) toward the test surface 23 (consisting of one side of a computer disk 22) positioned collinearly (with respect to the light beam) and substantially in parallel to the reference surface at some distance within the coherence length of the light source 10. As those skilled in the art readily understand, the light reflected by the test surface 23 interferes with the light reflected at the reference surface 21 and, according to the principle of superposition, bright interference fringes are produced corresponding to all points on the reference surface where the optical path difference (OPD) of the light is equal to a multiple of its wavelength. A beam splitter 24 is placed between the spatial filter 16 and the collimating objective 18 in order to reflect the fringes to the side, so that they may be observed on a screen or directed to a camera 26 through appropriate lenses 28 for display, and/or to other instrumentation for recording and data processing. The interference fringes so produced are used to provide a measure of the flatness of the tested disk surface.

Most Fizeau interferometers use lasers operating in the single mode because of their very long coherence length (in the order of tens of meters) which permits the placement of the test surface at a practical distance from the reference surface. Because of the opposing positions of the reference and test surfaces, it is important to retain some separation between the two in order to avoid damage. In addition, because of the characteristics of single-mode light, the separation between the reference and test surfaces is not critical to obtain interference fringes so long as within the coherence length, thus facilitating the process of adjusting the position of a sample to produce fringes.

Prior-art equipment for measuring the flatness of computer-drive disks comprises mounting devices that permit the placement of the disk 22 in a desired predetermined spatial relation with respect to the transmission flat 20. Such devices are separate from and movable in relation to the interferometer and the transmission flat, so that the sample surface mounted on it can be placed as desired and then fixed for interferometric measurements. Appropriate mechanisms for adjusting the reference surface's tip and tilt are also provided, as well known in the art, operating on the back surface of the disk, rather than directly on the test surface. Accordingly, any variation in the relative position of the back and test surfaces, such as thickness variations, requires adjustments between measurements of successive disks.

Another problem, which results from the lack of direct connection between the mounting device and the interferometer and from the utilization of the disk's back surface as the operative point of contact for alignment, is the difficulty of keeping the test surface in optimal alignment with the reference surface as successive test samples (disks) may be wedged differently or have irregular or tilted rear surfaces that change the alignment of the front test surface. Moreover, pressure applied by the mounting mechanism may cause disk deformation, which in turn results in misalignment of the reference surface. In addition, the relative motion or vibrations between the transmission flat and the separate, remote disk mount can cause measurement errors. Accordingly, these devices are not very stable while performing repeated measurements.

Yet another problem lies in the close proximity that must be maintained between the test and reference surfaces to avoid background fringes while testing glass disks with a short-coherence light source. In order to eliminate interference due to reflections from the back side of the disk, the distance between the test and reference surfaces is typically in the order of inches, which complicates the handling of the disks during mounting and removal between tests, especially for automatic processing. Because the disk must be inserted with precision between the transmission flat and the mounting device, the limited space between them renders the operation cumbersome and relatively time consuming; therefore, while possibly acceptable for laboratory testing, it is not suitable for rapid testing of computer-drive disks in a commercial operation. Accordingly, there still exists a need for a practical solution to these problems.

BRIEF SUMMARY OF THE INVENTION

It is therefore an objective of this invention to provide a mounting mechanism that is more suitable than prior-art devices for automated or manual positioning of computer-drives disks in an interferometer for surface-flatness testing.

Another objective of the invention is a mounting mechanism that is rigidly connected to the interferometer, so as to provide more stability of alignment when subjected to vibrations.

Another goal of the invention is a mounting mechanism that does not require insertion of the disk between the mount and the reference surface between measurements.

A further objective of the invention is a mounting mechanism that minimizes manipulation of the test disk.

Another goal of the invention is its general application to instruments that utilize the effect of interference between reflections from two parallel surfaces traversed collinearly by a beam of light.

Finally, another goal is the implementation of the above mentioned objectives in a commercially viable system that maximizes the utilization of existing technology.

In accordance with these and other objectives, the preferred embodiment of the method and apparatus of this invention consists of a Fizeau interferometer that utilizes a multimode laser as a light source for testing thin-plate computer-drive disk samples. One aspect of the invention concerns a horizontal shaft rigidly connected to the interferometer in axial alignment with the optical path of the instrument and protruding through an opening in the center of the transmission flat. A sample stage adapted to receive a computer-drive disk is attached to the distal end of the shaft, so that the stage is directly and rigidly connected to the interferometer.

Another aspect of the invention regards the mechanism for mounting the disk to the sample stage. It consists of a hub capable of retaining a disk in precise alignment with the transmission flat by hanging its center hole on two support posts and resting the disk on three pressure tips on the hub. A system of push-pull adjustment screws is provided to set the proper tip/tilt of the disk. The plane established by the three pressure tips provides a fixed, aligned plane against which the test surface of successive disks is directly positioned in alignment with the reference surface. By utilizing gravity to position the disk against the three pressure tips in substantially vertical disposition, deformation of the disk is minimized.

Still another aspect of the invention, related to the specific configuration of the mounting mechanism, is the outward-facing position of the disk, whereby it need not be inserted in a narrow space adjacent to the transmission flat. Rather, the disk is suspended from the outer direction of the mounting mechanism and requires no special attention to avoid contact with other components of the interferometer during replacement or flipping to test the opposite side.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

DETAILED DESCRIPTION OF THE INVENTION

The main thrust of this invention lies in the idea of connecting the test sample directly to the interferometer through an aperture in the transmission flat. A horizontal shaft disposed substantially coaxially with the optical axis of the instrument provides the means for connecting the disk mounting mechanism to the interferometer, thereby minimizing the effects of system vibrations. Another important concept of the invention concerns the method by which the disk is affixed to the mounting mechanism. Utilizing its center hole, the disk is suspended from two support posts and allowed to rest on three fixed tips that operate directly on the reference surface and determine its alignment with the transmission flat.

Figure 1:
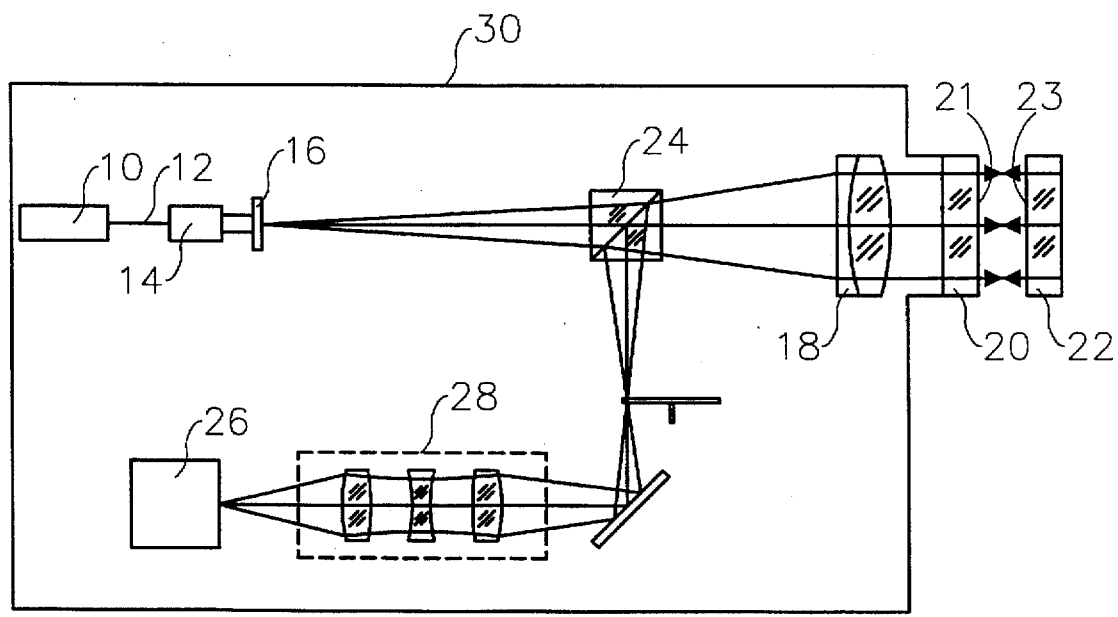
FIG. 1 is a schematic representation of a Fizeau interferometer including a separate mounting mechanism for a test surface according to the prior art.
Figure 2:
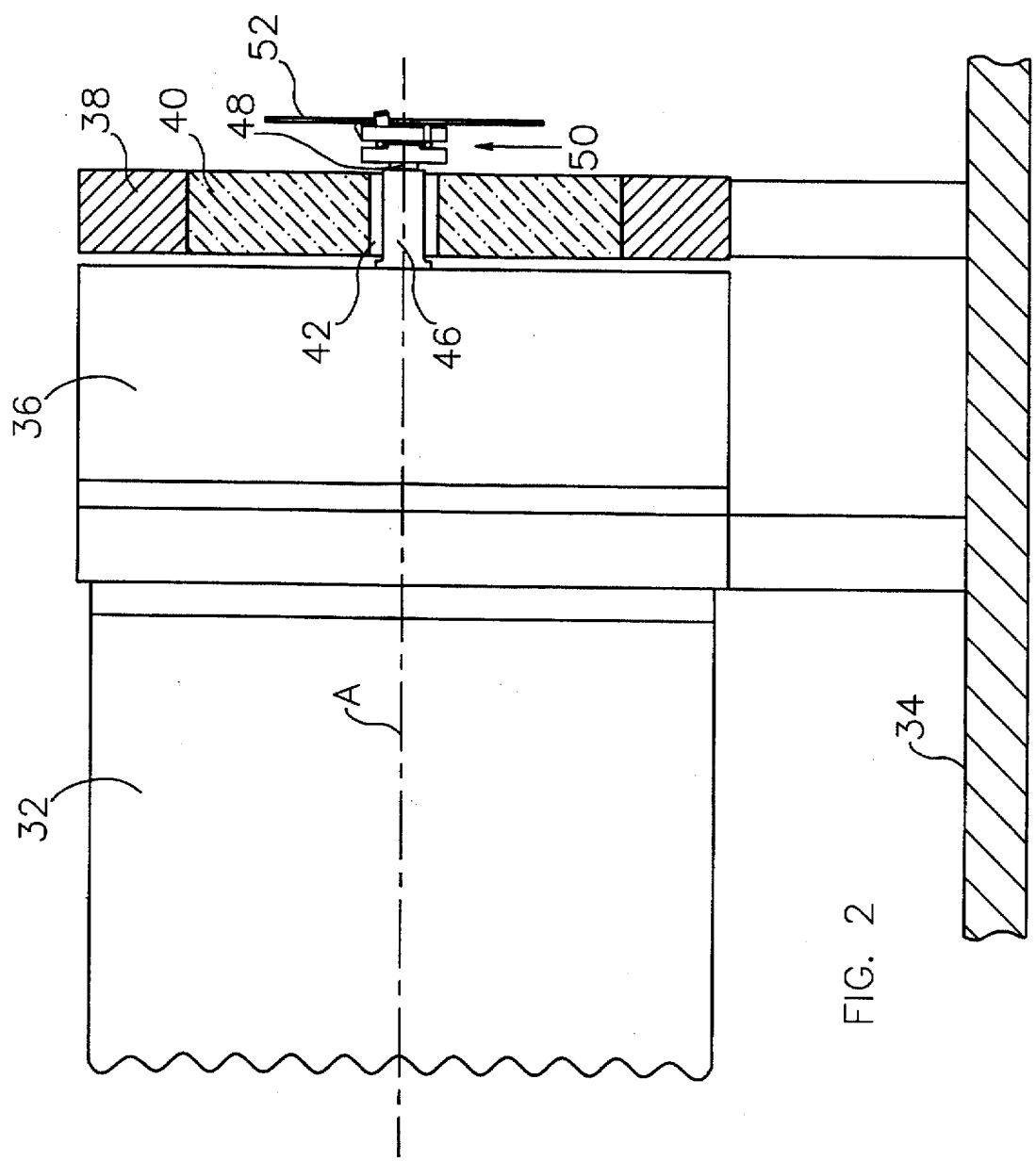
FIG. 2 is a schematic side-view illustration of the computer-drive disk mounting mechanism for the interferometer of the present invention.

Referring to the drawings, wherein like parts are designated with like numerals and symbols, FIG. 2 is a schematic representation of a mounting mechanism according to the present invention. The apparatus consists of an interferometer 32 fixed to a rigid support structure 34 and comprising a translation or scanning mechanism 36 (typically a micromotion mechanism such as a piezoelectric element) and a reference-optic cell 38 (also fixed to the structure 34) that holds a transmission flat 40 substantially normal to the optical axis A of the instrument. As also seen with more clarity in FIG. 3, the transmission flat 40 has a preferably circular, centrally located, opening 42 (coaxially placed with respect to the optical axis A of the instrument) approximately the size of the center hole 44 (see FIG. 4) in the disk to be tested. The proximal end of a substantially horizontal shaft 46 is rigidly connected to the translation mechanism 36 and the shaft extends forward through the opening 42 in the transmission flat in substantial coaxial alignment with the optical path of the instrument. The opening 42 can be smaller than the disk's center hole 44, so long as sufficiently large to permit a shaft to pass through it, but it could not be significantly larger than the hole 44 and retain the characteristics required to practice the invention, as will become more apparent from the description below. To complete the apparatus of the invention, the distal end 48 of the shaft 46 is rigidly attached to the mounting mechanism 50, which is adapted to hold a computer-drive disk 52 by means of a hub connected to the disk's center hole 44.

Figure 3:
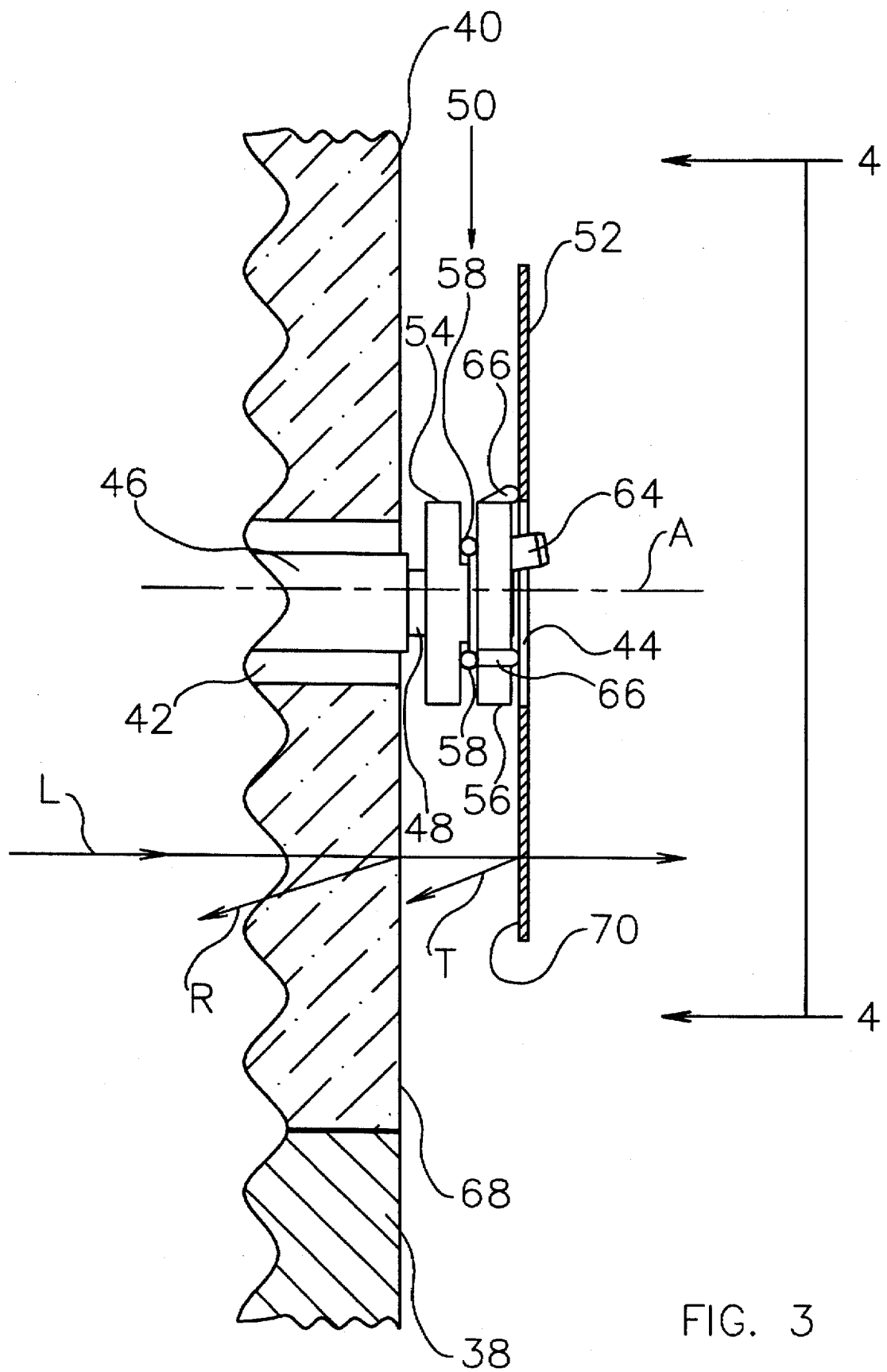
FIG. 3 is an enlarged, partially sectioned, schematic illustration of the mounting mechanism of FIG. 2.
Figure 4:
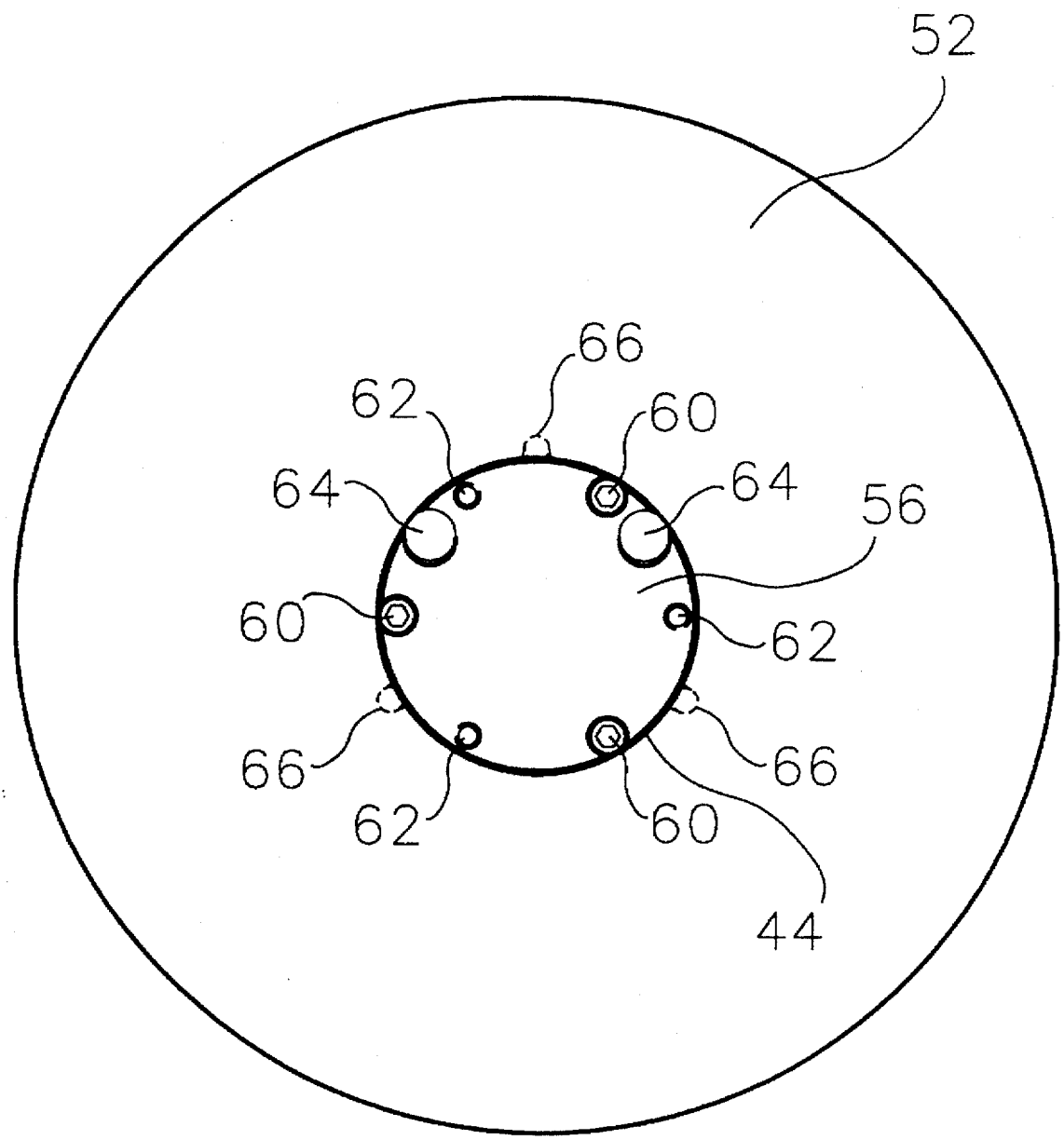
FIG. 4 is a side view of a computer-drive disk installed on the mounting mechanism of the invention taken from line 4—4 in FIG. 3.
Figure 5:
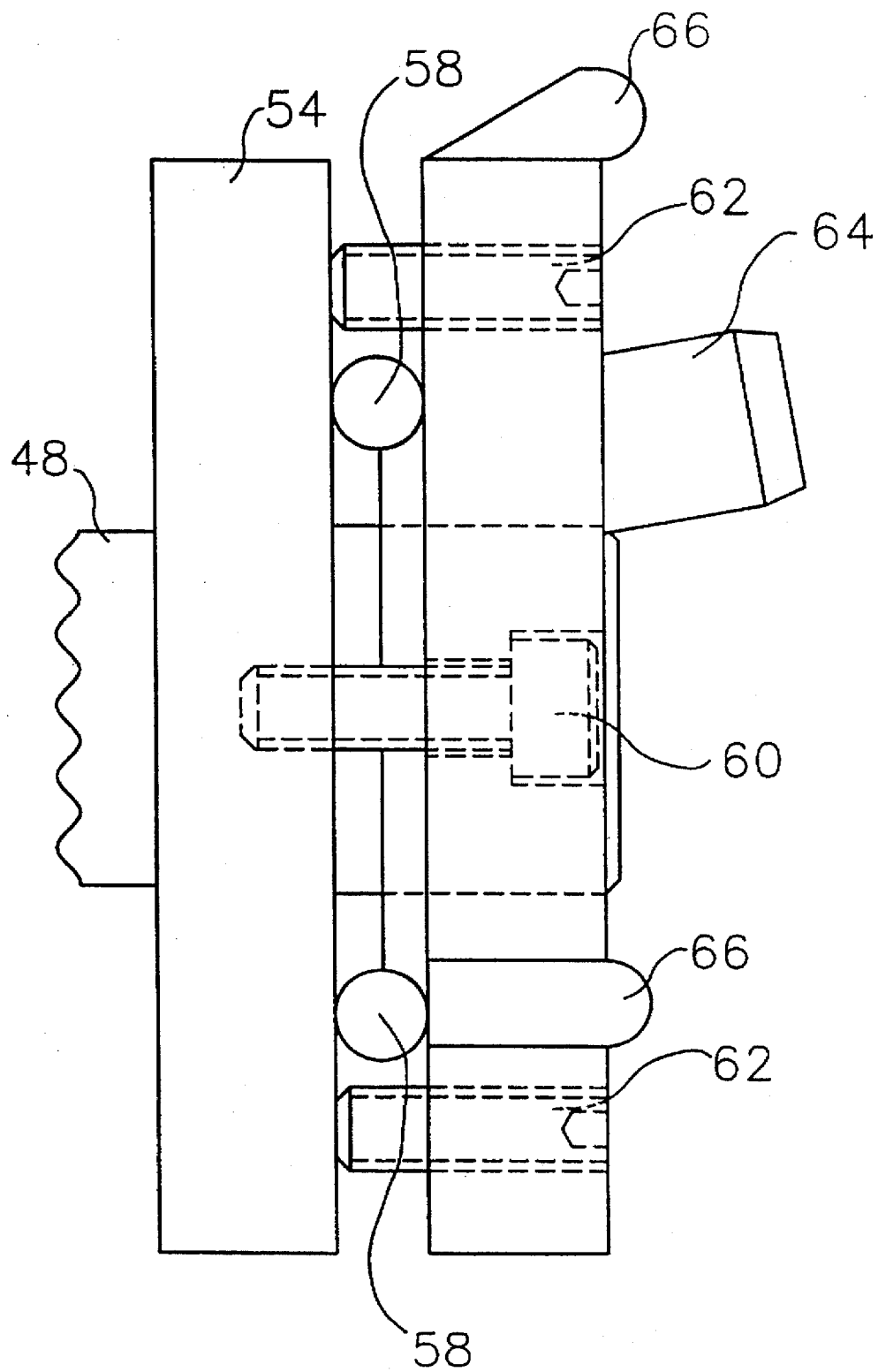
FIG. 5 is a schematic drawing of various connections between the base fixture, the tip/tilt plate, the cap screws and the set screws of the mounting mechanism of the invention.

Referring more particularly to the enlarged views of FIGS. 3 and 4, the mounting mechanism 50 comprises a preferably circular base fixture 54 rigidly attached to the distal end 48 of the shaft 46 in substantially parallel disposition with respect to the transmission flat 40. A tip/tilt plate 56 is fastened to the base fixture 54 through a resilient O-ring 58 that provides a flexible connection between the two for adjustment of the tip and tilt of the test surface. The connection between the two plates is made rigid by three cap screws 60, which pass through and urge the tip/tilt plate 56 toward the base fixture 54 to which they are threadably connected, and three set screws 62 rotatably threaded in the fixture 54 for pushing the tip/tilt plate 58 away from the base fixture 54. Thus, the interaction between the two sets of screws has the effect of locking the tip/tilt plate rigidly in place against the base fixture. The various threaded connections between the base fixture 54, the tip/tilt plate 56, the cap screws 60 and the set screws 62 are illustrated in the schematic drawing of FIG. 5.

The tip/tilt plate 56 features two support posts 64 protruding forward and slightly upward from the upper portion of the plate, such that a computer-drive disk 52 placed on them would hang freely and be substantially coaxial with the optical axis A and parallel to the tip/tilt plate. Three solid pressure tips 66 define a plane on the tip/tilt plate 56 to provide the firm support against which the test surface of the disk 52 can rest as a result of the gravity components affecting its disposition while suspended from the support posts 64. Thus, the exact position of the disk 52 is determined by the position of the tip/tilt plate and can be adjusted and locked with the push/pull set-/cap-screw arrangement to the desired placement in relation to the reference surface 68 of the transmission flat 40. It is noted that the same functional effect could be achieved by a single post 64 located at the top of the center hole 44 of the disk 52.

As would be obvious to those skilled in the art, the light L incident to the transmission flat 40 is partially reflected by the reference surface 68 (producing a reference beam R) and partially transmitted to the test surface 70, where it is also partially reflected (producing a test beam T) to provide an interfering beam. For the purpose of testing the flatness of a disk surface 70 facing the light beam L, the entire surface of the disk must be capable of illumination by the light transmitted through the flat 40. Therefore, the size of the tip/tilt plate 56 and of the base fixture 54 cannot be materially greater than (and preferably is the same as) that of the disk's center hole 44, so as to avoid any obstruction in the light path to the test surface.

It is noted that the disk 52 is mounted on the device of the invention from the front of the mounting mechanism 50, thereby avoiding interaction with the reference surface even when the disk is required to be placed in its close proximity. Accordingly, the apparatus and method of the invention are suitable for rapid, automated disk installation and replacement for quality control purposes in an assembly line. In addition, because of the direct connection between the sample stage and the interferometer, the system is very stable from effects of environmental vibrations and thermal variations.

It is clear from the breadth of application of the concepts covered by this invention that those skilled in the art could in obvious manner include refinements that have been ignored in this disclosure. Obvious changes could be made that are intended to be within the scope of this disclosure. For example, the same principles could be applied to a system where the transmission flat is translated, rather than the sample stage. Such instrument would also have a disk mounting mechanism connected directly to the interferometer, but the translation mechanism would operate separately on the cell 38 housing the transmission flat 40. Similarly, the invention is described with two support posts 64 in substantial horizontal alignment, but it could be implemented in equivalent fashion with a plurality of appropriately placed support posts, or with a single post combined with at least one alignment pin, hole or slot to fix the position of the disk with reference to the tip/tilt plate. Also, the invention is described herein with reference to a Fizeau interferometer having a horizontal optical axis normal to the test surface in a disk, but the specific configuration of a particular instrument can be changed to best fit a user's need so long as the principles disclosed herein are retained. While this description focuses on computer-drive disks, it is also obvious that the concepts of the invention are equally applicable to measurements of any test surface in a sample consisting of a structure having a hole suitable for suspension from support means protruding from an opening in the reference surface of the interferometer.

Therefore, it is understood that many equivalent systems are possible within the scope of the present invention and that those skilled in the art could easily design a special system for a specific application. Thus, various changes in the details and steps that have been described may be made by those skilled in the art within the principles and scope of the invention herein illustrated and defined in the appended claims. While the present invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

We claim:

1. A mounting mechanism for an interferometric device to scan a test surface of a structure containing a hole, wherein said test surface is aligned along an optical axis of the device, said mechanism comprising:
   (a) a reference surface having an opening therewithin substantially aligned with said optical axis;
   (b) support means for supporting said test surface, said support means having a proximal end connected to the device and a distal end protruding through said opening in the reference surface in substantial alignment with said optical axis; and
   (c) mounting means for mounting and holding in place said test surface on said distal end of the support means, such that the test surface is in substantial alignment with said optical axis and said hole is substantially aligned with said opening in the reference surface, whereby a test beam of light transmitted through the reference surface illuminates said test surface.

2. The device of claim 1, wherein said opening in the reference surface is substantially centrally located within the reference surface.

3. The device of claim 2, wherein said opening in the reference surface is substantially circular.

4. The device of claim 3, wherein said opening in the reference surface is no larger than approximately the size of said hole in the disk to be tested.

5. The device of claim 1, wherein said support means consists of a rigid shaft protruding through said opening in the reference surface.

6. The device of claim 1, further comprising adjustment means for adjusting a position of said test surface in relation to said reference surface.

7. The device of claim 1, wherein said mounting means comprises at least one support post from which the test surface can be suspended through said hole.

8. The device of claim 7, further comprising adjustment means for adjusting a position of said test surface in relation to said reference surface.

9. The device of claim 1, wherein said mounting means comprises a base fixture rigidly connected to said distal end of the support means in substantial alignment with said optical axis and comprises at least one support post from which the test surface can be suspended through said hole.

10. The device of claim 9, further comprising adjustment means for adjusting a position of said test surface in relation to said reference surface.

11. The device of claim 1, wherein said mounting means comprises a base fixture rigidly connected to said distal end of the support means in substantial alignment with said optical axis and comprises a tip/tilt plate disposed substantially in parallel with the base fixture, said tip/tilt plate comprising at least one support post from which the test surface can be suspended through said hole.

12. The device of claim 11, further comprising a resilient O-ring disposed between said base fixture and said tip/tilt plate.

13. The device of claim 12, wherein said tip/tilt plate further comprises three pressure tips defining a plane to provide a support against which said test surface can rest while suspended from said at least one post.

14. The device of claim 11, further comprising adjustment means for adjusting a position of said test surface in relation to said reference surface.

15. The device of claim 13, further comprising adjustment means for adjusting a position of said test surface in relation to said reference surface.

16. The device of claim 15, wherein said adjustment means consists of a plurality of rotatable cap screws threadedly mounted on said base fixture and adapted to urge said tip/tilt plate toward the base fixture and a plurality of set screws rotatably threaded in said tip/tilt plate for urging the plate away from the base fixture.

17. A mounting mechanism for an interferometric device for scanning a test surface of a computer-drive disk having a center hole, wherein said test surface is aligned along an optical axis of the device, said mechanism comprising:

(a) a reference surface having an opening substantially centrally-located therewithin and substantially aligned with said optical axis;

(b) support means for supporting said test surface, said support means having a proximal end connected to the device and a distal end protruding through said opening in the reference surface in substantial alignment with said optical axis;

(c) mounting means for mounting and holding in place said test surface, said mounting means comprising a base fixture rigidly connected to said distal end of the support means in substantial alignment with said optical axis and comprising a tip/tilt plate disposed substantially in parallel with the base fixture, said tip/tilt plate comprising at least one support post from which the test surface can be suspended through said center hole, whereby a test beam of light transmitted through the reference surface illuminates said test surface;

(d) a resilient O-ring disposed between said base fixture and said tip/tilt plate;

(e) three pressure tips on said tip/tilt plate defining a plane to provide a support against which said test surface can rest while suspended from said at least one support post; and (f) adjustment means for adjusting a position of said test surface in relation to said reference surface;

wherein said opening in the reference surface is no larger that approximately the size of said center hole in the disk to be tested.

18. The device of claim 17, wherein said adjustment means consists of a plurality of rotatable cap screws threadedly mounted on said base fixture and adapted to urge said tip/tilt plate toward the base fixture and a plurality of set screws rotatably threaded in said tip/tilt plate for urging the plate away from the base fixture.

19. An interferometric method for scanning a test surface of a structure having a hole, wherein said test surface is aligned with a reference surface along an optical axis of an interferometric device, said method comprising the following steps:

(a) providing an opening within said reference surface;

(b) providing a support means for supporting said test surface, said support means having a proximal end connected to the device and a distal end protruding through said opening in the reference surface in substantial alignment with said optical axis;

(c) providing mounting means for receiving and holding in place said test surface on said distal end of the support means such that the test surface is in substantial alignment with said optical axis;

(d) mounting said test surface on said mounting means on the distal end of the support means; and (e) varying an optical path difference between said reference and test surfaces to produce interference fringes.

20. The method of claim 19, wherein said opening in the reference surface is substantially centrally located and circular and is no larger that approximately the size of said hole in the structure to be tested.

21. The method of claim 19, wherein said support means consists of a rigid shaft protruding through said opening in the reference surface.

22. The method of claim 19, further comprising the step of providing adjustment means for adjusting a position of said test surface in relation to said reference surface.

23. The method of claim 19, wherein said mounting means comprises at least one support post from which the test surface can be suspended through said hole and wherein said step (d) is achieved by suspending said test surface on said at least one support post through said hole.

24. The method of claim 23, further comprising the step of providing adjustment means for adjusting a position of said test surface in relation to said reference surface.

25. The method of claim 19, wherein said mounting means comprises a base fixture rigidly connected to said distal end of the support means in substantial alignment with said optical axis and comprises at least one support post from which the test surface can be suspended through said hole.

26. The method of claim 25, further comprising the step of providing adjustment means for adjusting a position of said test surface in relation to said reference surface.

27. The method of claim 19, wherein said mounting means comprises a base fixture rigidly connected to said distal end of the support means in substantial alignment with said optical axis and comprises a tip/tilt plate disposed substantially in parallel with the base fixture, said tip/tilt plate comprising at least one support post from which the test surface can be suspended through said hole.

28. The method of claim 27, further comprising the step of providing a resilient O-ring disposed between said base fixture and said tip/tilt plate.

29. The method of claim 27, further comprising the step of providing three pressure tips on said tip/tilt plate defining a plane to provide a support against which said test surface can rest while suspended from said at least one support post.

30. The method of claim 29, further comprising the step of providing adjustment means for adjusting a position of said test surface in relation to said reference surface.

31. The method of claim 30, wherein said adjustment means consists of a plurality of rotatable cap screws threadedly mounted on said base fixture and adapted to urge said tip/tilt plate toward the base fixture and a plurality of set screws rotatably threaded in said tip/tilt plate for urging the plate away from the base fixture.

* * * * *